United States Patent [19]

Joubert et al.

[11] Patent Number: 4,992,196

[45] Date of Patent: Feb. 12, 1991

[54] SILICONATE TREATED SODIUM TRIPOLYPHOSPHATE FOR LIQUID DETERGENT FORMULATIONS

[75] Inventors: Daniel Joubert, Trevoux; Philippe Jost, Taluyers, both of France

[73] Assignee: Rhone-Poulenc Chimie, Courbevoie, France

[21] Appl. No.: 381,271

[22] Filed: Jul. 18, 1989

[30] Foreign Application Priority Data

Jul. 20, 1988 [FR] France ............................... 88 09794

[51] Int. Cl.$^{5}$ .......................... B01F 3/20; C09K 3/18; C11D 7/16; C11D 9/36

[52] U.S. Cl. ............................... 252/135; 106/287.13; 106/287.14; 252/174.13; 252/174.15; 252/383; 252/385; 252/363.5

[58] Field of Search ........... 106/287.1, 287.13, 287.14; 252/135, 174.13, 174.15, 383, 385, 363.5

[56] References Cited

U.S. PATENT DOCUMENTS

| | | | |
|---|---|---|---|
| 4,419,250 | 12/1983 | Allen | 252/8.6 |
| 4,421,657 | 12/1983 | Allen | 252/8.6 |
| 4,482,471 | 11/1984 | Allen | 252/186.31 |
| 4,482,477 | 11/1984 | Allen | 252/540 |
| 4,664,838 | 5/1987 | Joubert | 252/135 |

OTHER PUBLICATIONS

"Rhodorsil Siliconate 51T" Bulletin Published by Rhone Poulenc, Courbevoie, France, Nov. 1985, 4 pages.

*Primary Examiner*—Dennis Albrecht
*Attorney, Agent, or Firm*—Finnegan, Henderson, Farabow, Garrett, and Dunner

[57] ABSTRACT

A sodium tripolyphosphate employed for the formulation of detergent compositions with a water content ranging from 0.8 to 6% in the form of hexahydrate crystals and containing 0.2 to 2% by weight of siliconate. Also, a process for the preparation of such a sodium tripolyphosphate comprising spraying an aqueous solution containing between 5 and 10% of siliconate at weight onto a sodium tripolyphosphate containing at least 50% of phase 1 and having a particle diameter distribution ranging from 600 to 2,500 microns; and grinding the hydrated tripolyphosphate containing the siliconate to a mean particle diameter ranging from 80 to 200 microns.

11 Claims, No Drawings

SILICONATE TREATED SODIUM TRIPOLYPHOSPHATE FOR LIQUID DETERGENT FORMULATIONS

The present invention relates to a sodium tripolyphosphate specially adapted for the preparation of liquid detergent formulas.

It is known that anhydrous tripolyphosphate can be obtained in different crystalline forms, phase I or phase II, which behave differently on hydration. Thus, phase I is hydrated very quickly but tends to give rise to solidification and curdling which creates problems in industrial use. Phase II on the other hand gives homogenous pastes, but speed of hydration thereof is unfortunately too slow.

A patent disclosing special builders for use in liquid compositions is European Patent Application No. 178,986, which describes a sodium tripolyphosphate containing at least 50% of phase 1, a mean particle diameter of between 130 and 250 microns, a water content of between 0.04 and 4%, water being present in the form of crystals of sodium tripolyphosphate hexahydrate which are distributed homogeneously in each particle size fraction of the product.

The above mentioned tripolyphosphate was intended for the preparation of liquid formulations. However, it suffers from the disadvantage that, when used, lumps are formed in the aqueous solution.

The present invention solves this problem by providing a sodium tripolyphosphate consisting of a tripolyphosphate (TPP) such as described in EPA No. 178,986, containing at least 50% of phase 1 and preferably at least 70%, a mean particle diameter ranging from 80 to 200 microns, a weight content of water ranging from 0.8 to 6% essentially in the form of sodium tripolyphosphate hexahydrate and a weight content of siliconate ranging from 0.2 to 2% (active substance), calculated relative to the tripolyphosphate. The siliconate used is preferably a compound of the following formula (I):

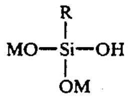

(I)

in which:

R is a methyl or ethyl group, and

M is an alkali metal selected from sodium and potassium.

It is preferred that the TPP according to the invention has an RRB (Rosin Ramler Benett) mean particle diameter ranging from 80 to 200 microns and does not contain more than 0.5% of particles with diameters larger than 400 microns. It is more preferred that the TPP mean particle diameter range from 100 to 150 microns and have a content of phase 1 of at least 70%.

The presence of siliconate makes it possible to achieve hydration of the tripolyphosphate, while avoiding the formation of agglomerates. The siliconate does not modify the hydration criteria, such as the "ROH." The "ROH," or rate of hydration, corresponds to the temperatures reached after one and five minutes when 150 g of sodium tripolyphosphate are introduced into a medium consisting of 200 g of water and 50 g of sulfate, maintained at 80° C. The higher the "ROH," the faster the hydration.

It is particularly surprising that the siliconate allows a better dispersion of the tripolyphosphate in water, and does not result in a decrease in the "ROH" and hence a decrease in the ease of hydration of the tripolyphosphate. The siliconate is a product which imparts water-repellency and would have been expected to prevent the contact between water and the tripolyphosphate and consequently slow down the hydration. In fact, this is not the case. The siliconate increases the dispersion of the tripolyphosphate, and this has a markedly greater effect than the slowing down of the hydration due to its water-repellent effect, the combination being reflected in a marked increase in the rate of hydration and the disappearance of the agglomeration phenomenon.

The process for the preparation of this modified tripolyphosphate preferably starts with an anhydrous tripolyphosphate containing at least 50% of phase 1 and having a particle diameter ranging from 600 to 2,500 microns. An aqueous solution containing 5 to 50% by weight of siliconate (active substance) and optionally containing dissolved tripolyphosphate is then sprayed onto the anhydrous TPP.

The process for the preparation of the tripolyphosphate according to the invention will now be described in more detail.

The starting material is a tripolyphosphate resulting from a single polycondensation at a fixed temperature so that the TPP contains at least 50% of phase 1.

A coarse primary grinding of this TPP preferably is then carried out by any known means.

This primary grinding is preferably conducted so as to obtain a product with an RRB (Rosin Rambler Benett) mean particle diameter ranging from 600 to 2,500 microns.

The ground tripolyphosphate may then be prehydrated by spraying onto it, an aqueous solution of siliconate to which tripolyphosphate in suspension may be optionally added.

This optional suspension may be prepared by adding to the water containing the siliconate a sufficient quantity of anhydrous TPP to be supersaturated. A suspension with a TPP content ranging from 30 to 35% of TPP is preferably prepared. To prepare the suspension, a TPP which preferably has the same homogeneity of distribution of phase 1 as that described above for the TPP of the invention, is employed. Under these conditions, the TPP can be converted into hexahydrate in the suspension.

The spraying can be carried out according to any suitable means. The quantity of sprayed suspension preferably ranges from 2 to 6% by weight relative to the anhydrous TPP.

Following the spraying, the prehydrated TPP may be subjected to a secondary grinding which gives it the particle size of the final product, defined by the RRB mean diameter, ranging from 80 to 200 microns, and a maximum oversize of 0.5% at 400 microns. This secondary grinding helps make it possible to achieve the homogeneous distribution of the crystals of TPP hexahydrate in each fraction of the particle size population. The product may then be subjected to a maturing stage comprising a ventilation and a cooling.

The hydrated TPP containing the siliconate can be employed for preparing liquid detergent compositions.

EXAMPLE

The formula of the siliconate employed is:

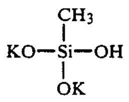

(1) Preparation of the Improved TPP

Starting with a hydrated TPP in accordance with European Patent Application No. 178,986, the following post-treatments were conducted:

1. Superhydration with approximately 1% of water, by spraying water onto the TPP in a Lodige laboratory mixer.

2. Superhydration with approximately 1% of a 50/50 mixture of siliconate 51T ® and water, using the same technique as above (sprayer and Lodige), which corresponds to approximately 1% by weight of dry siliconate calculated relative to the TPP.

After the mixer was drained, the products matured for approximately 24 hours on a tray, in ambient conditions, for crystallization. They were sieved on a 400 micron sieve to remove any particles, from grinding or from agglomeration, larger than this size.

(2) Evaluation Tests

The two products obtained (the above TPP plus TPP with 1% of water added) were evaluated for two properties, in comparison with the untreated reference:

1. Test for "immediate" dispersibility in water

The dispersibility test was as follows:

20 g of the product to be tested were added quickly to 150 cc of demineralized water at 20° C., placed in a 250 ml beaker and stirred gently with a magnetic stirrer. Mixing was allowed to take place for 20 seconds and the whole was then quickly emptied onto a 630 micron sieve, and the quantity of TPP retained on the sieve was evaluated. (If there has been no agglomeration in contact with water, nothing should be retained on the sieve).

2. Conventional ROH test

This second test was introduced in order to check that the siliconate did not have an unfavorable effect on the kinetics of hydration of TPP in water, which would obviously be disadvantageous.

(3) Results

These are reported in the summary table below:

| | Loss at 550° C. | Residues on sieve (dispersibility test) | ROH °C. 1' | ROH °C. 5' |
|---|---|---|---|---|
| TPP EP 178,986 | 4.65% | Approximately 18 g, i.e., 90%-stirrer jamming (power increase) | 93.6 | 95.5 |
| Superhydrated TPP (1% of water) | 5.50% | Approximately 15 g, i.e., 75%-stirrer jamming | 91.6 | 93.8 |
| TPP + solution (50/50 water/siliconate)* | 5.30% | Approximately 3 g, i.e., 15%-no stirrer jamming | 91.9 | 93.8 |

*The siliconate content of siliconate 51 T ® is approximately 45% of siliconate active substance diluted in water.

What is claimed is:

1. A process for the preparation of a sodium tripolyphosphate having 0.2 to 2% by weight of siliconate a phase 1 content of at least 50%, a mean particle diameter ranging from 80 to 200 microns and a water content in the form of crystals of sodium tripolyphosphate hexahydrate ranging from 0.8 to 6%, by weight, said process comprising spraying an aqueous solution containing between 5 and 50% by weight of siliconate onto a sodium tripolyphosphate containing at least 50% of phase and having a particle diameter distribution ranging from 600 to 2,500 microns; and grinding the hydrated tripolyphosphate containing the siliconate to a mean particle diameter ranging from 80 to 200 microns.

2. The process according to claim 1, wherein the aqueous solution of siliconate further contains tripolyphosphate.

3. The process according to claim 2, wherein the quantity of aqueous solution of siliconate and tripolyphosphate that is sprayed ranges from 2 to 6% by weight relative to the anhydrous tripolyphosphate.

4. The process according to claim 1, wherein the percentage of particles having a diameter greater than 400 microns is less than 0.5%.

5. A sodium tripolyphosphate comprising 0.2 to 2% by weight of siliconate and having a phase 1 content of at least 50%, a mean particle diameter ranging from 80 to 200 microns, and a water content in the form of crystals of sodium tripolyphosphate hexahydrate ranging from 0.8 to 6%, by weight, wherein said tripolyphosphate is obtained by spraying an aqueous solution containing between 5 and 50% by weight of siliconate onto a sodium tripolyphosphate containing at least 50% of phase 1 and having a particle diameter distribution ranging from 600 to 2,500 microns; and grinding the hydrated tripolyphosphate containing the siliconate to a mean particle diameter ranging from 80 to 200 microns.

6. The tripolyphosphate according to claim 5, wherein the aqueous solution of siliconate further contains tripolyphosphate.

7. The tripolyphosphate according to claim 6, wherein the quantity of aqueous solution of siliconate and tripolyphosphate that is sprayed ranges from 2 to 6% by weight relative to the anhydrous tripolyphosphate.

8. The tripolyphosphate according to claim 5, wherein the percentage of particles having a diameter greater than 400 microns is less than 0.5%.

9. The tripolyphosphate according to claim 5, wherein said siliconate has the following formula (I):

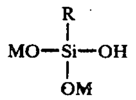

(I)

in which

R is selected from a methyl and ethyl group, and

M is an alkali metal selected from sodium and potassium.

10. The tripolyphosphate according to claim 5, wherein the content of phase 1 is at least 70% and the particle diameter ranges from 100 to 150 microns.

11. The tripolyphosphate according to claim 5, wherein the percentage of particles having a diameter greater than 400 microns is less than 0.5%.

* * * * *